United States Patent [19]

Margetts

[11] Patent Number: 4,759,429
[45] Date of Patent: Jul. 26, 1988

[54] WEDGE AND ROLLER BRAKE ACTUATOR

[75] Inventor: Hugh G. Margetts, Ross-on-Wye, Great Britain

[73] Assignee: Lucas Industries Public Limited Company, Birmingham, England

[21] Appl. No.: 18,410

[22] Filed: Feb. 25, 1987

[30] Foreign Application Priority Data

Mar. 5, 1986 [GB] United Kingdom ............... 8605393

[51] Int. Cl.⁴ .......................................... F16D 51/00
[52] U.S. Cl. .................................. 188/343; 188/72.7
[58] Field of Search ............... 188/72.7, 343, 196 BA; 74/110; 254/104

[56] References Cited

U.S. PATENT DOCUMENTS 1,848,775  3/1932  Girling .............................. 188/343

FOREIGN PATENT DOCUMENTS 1287980  9/1972  United Kingdom ............... 188/343

Primary Examiner—Andres Kashnikow
Assistant Examiner—Mark T. Le
Attorney, Agent, or Firm—Holman & Stern

[57] ABSTRACT

A wedge and roller actuator, primarily for a vehicle drum brake, has a wedge disposed between opposed tappets with interposed thrust-transmitting rollers. Inwardly directed thrust arising on one of the tappets is transmitted to a fixed surface of the actuator housing either by additional rollers or by one of the rollers. In the latter case, the surface of the housing reacting the inwardly directed force is inclined to the longitudinal axis of the wedge in the opposite direction to the opposed wedge surface.

16 Claims, 1 Drawing Sheet

WEDGE AND ROLLER BRAKE ACTUATOR

This invention relates to a wedge and roller actuator, primarily for a vehicle brake, being of the general kind in which the wedge is disposed between opposed tappets and rollers are arranged respectively at either side of the wedge to transmit thrust from the wedge to the tappets for actuation of braking elements engaged by the tappets. The invention also embraces a brake incorporating such an actuator.

In some conventional actuators of this kind, the wedge is allowed to float transversely of its actuating direction. When such an actuator is used in a shoe drum brake of leading/trailing configuration, although the wedge actuating force remains constant, the difference in drum servo effect on the leading and trailing shoes results in the wedge moving towards the leading shoe, giving rise to unequal tappet travel and uneven shoe wear. The wear rate of the leading shoe is normally about three times that of the trailing shoe.

An object of the present invention is to provide a wedge and roller actuator of simple and convenient construction in which this problem is alleviated or avoided.

According to the present invention, a wedge and roller actuator comprises a wedge disposed between opposed tappets, thrust rollers disposed respectively at either side of the wedge to transmit actuating thrust from actuating surfaces of the wedge to actuating surfaces of the tappets, at least one of said thrust rollers being also in force transmitting relationship with a fixed abutment surface in order to transmit to that surface inwardly directed forces arising on the tappet associated with the other roller.

When the actuator of the invention is incorporated in a shoe drum brake of leading/trailing shoe configuration, it can be arranged so that inwardly directed forces arising on the trailing shoe, which in a conventional actuator can lead to unequal tappet travel and the aforesaid resultant ill effects, are transmitted by the appropriate thrust roller for reaction at the fixed abutment surface so that the wedge is constrained to perform a substantially linear actuating travel and thereby increase the load applied to the trailing shoe tappet.

In one convenient arrangement, said abutment surface diverges from the line of action of the wedge, said abutment surface and the adjacent actuating surface of the wedge being preferably divergent. The angles of inclination of the abutment surface and the adjacent tappet actuating surface may be different, the angle of said adjacent tappet surface then being conveniently greater than, and typically twice, that of the abutment surface.

Preferably, the angles of inclination of said abutment surface and the opposed wedge surface are equal.

The invention will now be described, by way of example with reference to the accompanying drawings in which.

Figure 1:
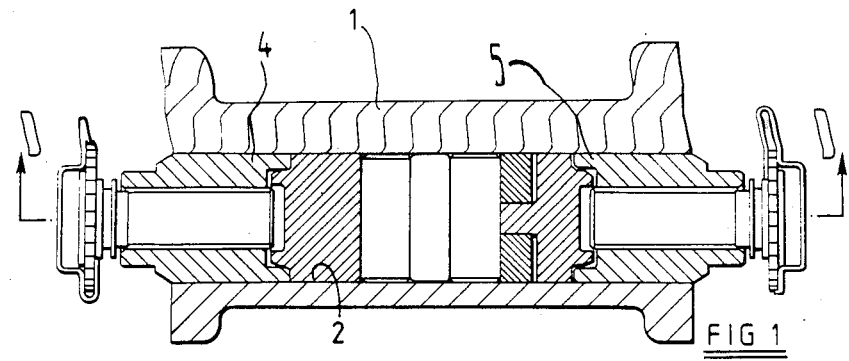
FIG. 1 is a longitudinal cross section of a further alternative form of the actuator of the invention.
Figure 2:
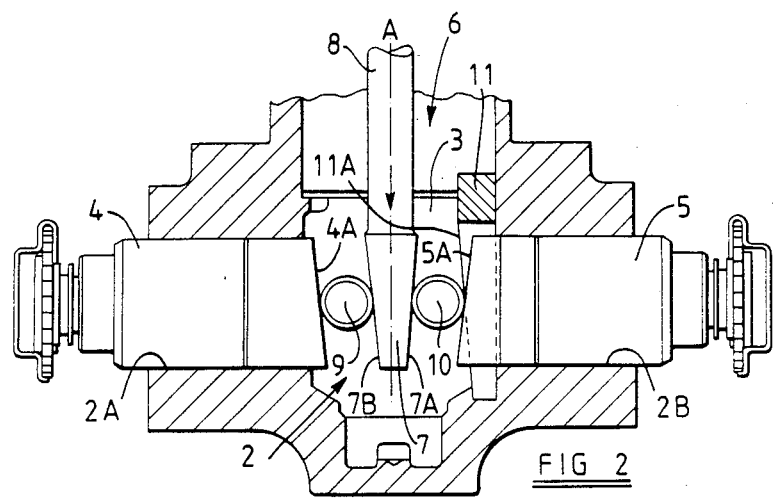
FIG. 2 is a cross section along the line D—D of FIG. 1.

Referring to FIGS. 1 and 2 of the drawings, the actuator shown therein has a body 1 having a through bore 2 and a transverse bore 3 extending at right angles to the bore 2. The bore 2 contains a pair of opposed tappets 4 and 5 disposed respectively in portions 2A, 2B of the bore 2 at either side of the bore 3, the tappets being normally engaged, in use, with respective brake shoes in a brake incorporating the actuator, for the purpose of applying brake actuating forces to the shoes.

Such forces are applied to the tappets 4 and 5 by means of a wedge device 6 which includes a wedge 7 fast with and reciprocal by means of an actuating rod 8, the wedge being located between a pair of rollers 9, 10 which would normally be carried by a cage (not shown) mounted on the rod 8.

Adjacent to the tappet 5, the body has an insert 11 secured therein providing an abutment surface 11A engaged by the roller 10 which also engages the actuating surface 5A of the tappet 5 and an opposed actuating surface 7A of the wedge. In the embodiment described, only a single thrust roller is provided at either side of the wedge for transmitting thrust to the tappets. It would, however, be possible to provide a plurality of such rollers at either side of the wedge, depending upon the sizes of the wedge and tappet actuating surfaces and the actuating thrust to be transmitted. In such an arrangement some or all of the thrust rollers at at least one side of the wedge are in thrust transmitting relationship with the abutment surface.

The abutment surface 11A and the opposed wedge actuating surface 7A are divergent, being preferably inclined, as shown, at the same angle relative to the line of action of the wedge, represented by the arrow A. The abutment surface 11A may alternatively be formed directly on the housing 1, should manufacturing techniques permit this. The roller 9 engages the wedge actuating surface 7B and opposed tappet actuating surface 4A.

The tappets 4 and 5 are expanded for brake actuation by moving the wedge along its line of action A within the bore 3, in order to apply outward force to the tappets via the interposed rollers 9 and 10 engaged between the tappet and wedge actuating surfaces. Any force arising on the wedge 7 as a result of differing drum servo-action on the respective shoes is reacted via the roller 10 against the abutment surface 11A. The wedge is thereby constrained to move in a substantially linear manner and the tendency found in some conventional brakes for unequal tappet travel as a result of the aforesaid servo-action is reduced or substantially eliminated. The invention achieves this in a particularly simple and convenient manner by using at least one of the two thrust rollers (9, 10) to transmit to the abutment surface inward forces on the opposed tappet, thereby minimising the number of components required.

Figure 3:
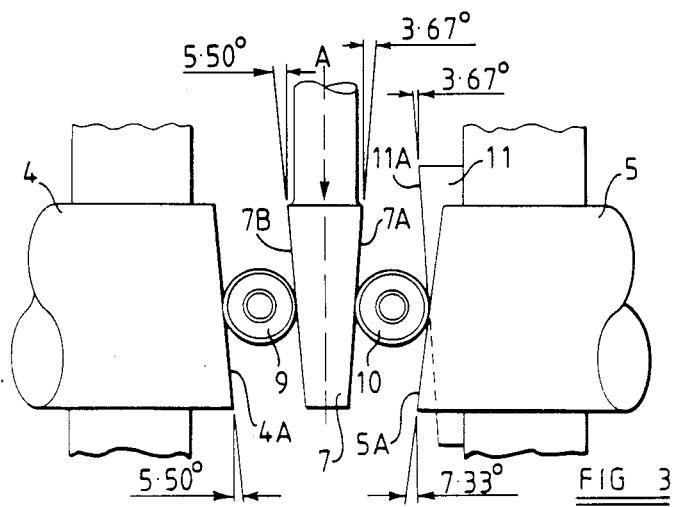
FIG. 3 is a diagrammatic representation of the actuator of FIGS. 2 and 3 illustrating some theoretical values.

The preferred values of the angles of inclination of the various surfaces involved are enumerated in FIG. 3. From this it will be seen that the wedge is asymmetric, such that the wedge surface 7B which actuates the tappet of the trailing shoe via the roller 9 is inclined at 5.5° to the wedge axis A, whereas the opposed wedge face 7A is inclined at 3.67° to the wedge axis. The angle of inclination of the reaction surface 11A in the opposite direction to that of the wedge surface 7A is also 3.67°, whereas the inclined surface 5A of the tappet 5 against which the roller 10 is also engaged is inclined in the same direction as the wedge surface 7A, but at 7.33°. The corresponding surface 4A of the tappet 4 is inclined in the same direction as the wedge surface 7B and at the same inclination as the latter, namely 5.5°.

These values are chosen to ensure that the friction forces on the rollers is greater than the resultant forces arising on the roller at the surfaces 11A and 5A, thereby enabling the roller 10 to perform true rolling motion in similar manner to roller 9. It is thought that an actuator in which the various operative surfaces are arranged in the manner illustrated in FIG. 3 will provide an ideal basis for a practical brake actuator.

In an alternative arrangement, the wedge actuating surfaces are both inclined at the same angle to the wedge line of action, with both tappet actuating surfaces parallel to the respective opposed wedge actuating surfaces. The respective angles of divergence of the fixed abutment surface and opposed wedge surface are then equal.

It will be understood that the arrangements described may be further modified in various ways whilst still embodying the principle of the invention. For example, a fixed abutment may be provided at each side of the wedge to react forces applied by the tappets in both directions. One or both of the tappets may be provided with an automatic adjuster device of any conventional type.

I claim:

1. A wedge and roller actuator comprising:
   a housing having a first bore and a second bore extending at right angles to the first bore;
   opposed tappets provided in the second bore and having respective actuating surfaces;
   a wedge movable along a line of action and disposed between the opposed tappets; and
   thrust rollers disposed respectively at either side of the wedge to transmit actuating thrust from actuating surfaces of the wedge to the actuating surfaces of the tappets, at least one of said thrust rollers being also in force-transmitting relationship with a fixed abutment surface fixed relative to the housing in order to transmit to said abutment surface inwardly directed forces arising on the tappet associated with the other roller.

2. An actuator according to claim 1 wherein said abutment surface diverges from the line of action of the wedge.

3. An actuator according to claim 1 wherein said abutment surface and the adjacent actuating surface of the wedge are divergent.

4. An actuator according to claim 1 wherein said tappet actuating surfaces are oppositely inclined to said abutment surface with respect to said wedge line of action.

5. An actuator according to claim 1 wherein the angles of inclination of said abutment surface and the tappet actuating surface adjacent said abutment surface are different.

6. An actuator according to claim 5 wherein the angle of inclination of said tappet actuating surface adjacent the abutment surface is greater than that of said abutment surface.

7. An actuator according to claim 5 wherein the angle of inclination of said tappet actuating surface adjacent said abutment surface is substantially twice that of said abutment surface.

8. An actuator according to claim 1 wherein the angles of inclination of the actuating surfaces of the wedge with respect to the wedge line of action are unequal.

9. An actuator according to claim 8 wherein the angle of inclination of the wedge actuating surface at the abutment side thereof to the wedge line of action is smaller than that of the wedge actuating surface at its other side.

10. An actuator according to claim 3 wherein said divergent surfaces are both inclined at the same first angle to the wedge line of action, and the adjacent tappet actuating surface is inclined in the same direction as the opposed wedge actuating surface with respect to said line of action but at a second angle which is twice the first angle.

11. An actuator according to claim 10 wherein said first and second angles are substantially 3.67° and substantially 7.33° respectively.

12. An actuator according to claim 1 having a fixed abutment surface at one side only of the wedge, the wedge actuating surface at the other side of the wedge being parallel to the adjacent tappet surface.

13. An actuator according to claim 1 wherein the wedge actuating surfaces are both inclined at the same angle to the wedge line of action and both tappet actuating surfaces are parallel to the respective opposed wedge actuating surfaces, the respective angles of divergence of the fixed abutment surface and opposed wedge surface being equal.

14. An actuator according to claim 1 wherein a single thrust roller is provided at each side of the wedge.

15. An actuator according to claim 1 wherein said fixed abutment surface is on a separate component secured in the housing.

16. An actuator according to claim 1 wherein the wedge is operated by a push rod.

* * * * *